United States Patent [19]

Erkens et al.

[11] Patent Number: 5,853,472
[45] Date of Patent: Dec. 29, 1998

[54] TRANSPARENT BISMUTH VANADATE PIGMENTS

[75] Inventors: Leonardus Johannes Hubertus Erkens, Maastricht; Gregor Schmitt, Landgraaf, both of Netherlands; Hendrikus Maria Anna Hamers, Selfkant, Germany; Johannes Maria Martinus Luijten, Bocholtz; Jozef Gertruda Emanuel Mains, Nieuwstadt, both of Netherlands

[73] Assignee: Ciba Specialty Chemicals Corporation, Tarrytown, N.Y.

[21] Appl. No.: 863,312

[22] Filed: May 27, 1997

[30]   Foreign Application Priority Data

May 31, 1996 [CH] Switzerland .................. 1370/96

[51] Int. Cl.$^6$ .................................................. C04B 14/00
[52] U.S. Cl. .......................... 106/479; 106/400; 106/401; 423/593
[58] Field of Search ................... 106/479, 400, 106/401; 423/593

[56]   References Cited

U.S. PATENT DOCUMENTS

| | | | |
|---|---|---|---|
| 3,843,554 | 10/1974 | Aykan et al. | 252/468 |
| 3,962,173 | 6/1976 | Wick et al. | 106/479 |
| 4,063,956 | 12/1977 | Higgins | 106/479 |
| 4,115,142 | 9/1978 | Hess | 106/461 |
| 4,272,296 | 6/1981 | Balducci et al. | 106/461 |
| 4,316,746 | 2/1982 | Rustioni et al. | 106/461 |
| 4,455,174 | 6/1984 | Wienand et al. | 106/479 |
| 4,752,460 | 6/1988 | Herren | 423/593 |
| 5,123,965 | 6/1992 | Herren et al. | 106/479 |
| 5,203,917 | 4/1993 | Schwochow | 106/479 |
| 5,273,577 | 12/1993 | Liedek et al. | 106/479 |
| 5,336,312 | 8/1994 | Byrne et al. | 106/479 |
| 5,536,309 | 7/1996 | Etzrodt et al. | 106/479 |

FOREIGN PATENT DOCUMENTS 0441101  8/1991  European Pat. Off. .

OTHER PUBLICATIONS

The Bulletin of the Bismuth Institute, No. 68, (1995), Bismuth–Vanadate Pigments in Paint (No Mouth).

*Primary Examiner*—Mark L. Bell
*Assistant Examiner*—Scott L. Hertzog
*Attorney, Agent, or Firm*—Kevin T. Mansfield

[57]   ABSTRACT

Transparent bismuth vanadate pigments and a process for their preparation. Coating bismuth vanadate pigment precursors prepared by known methods with coating compositions conventionally used for coating pigments prior to the customary calcination gives bismuth vanadate pigments of high transparency.

12 Claims, No Drawings

TRANSPARENT BISMUTH VANADATE PIGMENTS

TRANSPARENT BISMUTH VANADATE PIGMENTS

The present invention relates to transparent bismuth vanadate pigments and their preparation. The pigments used for obtaining a transparent yellow shade in the paint industry, plastic industry and printing inks industry are, with the exception of transparent yellow iron oxide, organic pigments. The bismuth vanadate pigments, which have been known for a long time, inter alia from U.S. Pat. Nos. 3,843,554 and 4,115,142, and which are highly valued in particular for their low toxicity and their high chroma and fastness properties, so far existed only as highly opaque variants. The use of the bismuth vanadate pigments prepared by known methods is therefore restricted to opaque colorations.

In order to utilise the above-mentioned advantages of the bismuth vanadate pigments also for the transparent applications which are strongly on the increase today, it is desirable to be able to prepare said pigments also in a transparent variant.

Innummerable preparation methods for different bismuth vanadate pigments are known from the relevant literature. All of them result in opaque forms. Normally, bismuth-and vanadium-containing solutions are mixed in the presence of soluble metal salts and, optionally, soluble phosphates, sulfates and/or silicates, to precipitate the amorphous pigment precursor which is subsequently converted to the pigmentary form by calcination. Such methods are described, inter alia, in U.S. Pat. No. 5,536,309, U.S. Pat. No. 4,115,142, U.S. Pat. No. 4,272,296, U.S. Pat. No. 4,316,746, U.S. Pat. No. 4,455,174, U.S. Pat. No. 4,752,460, U.S. Pat. No. 5,203,917, U.S Pat. No. 5,336,312, U.S. Pat. No. 5,399,197 and EP 441,101.

Very surprisingly, it has now been found that by coating a pigment precursor prepared by customary methods, such as those described in the above publications, with a conventional coating material for pigments and subsequent calcination, transparent bismuth vanadate pigments are obtained which have good pigment properties.

Accordingly, this invention relates to a process for the preparation of transparent bismuth vanadate pigments, which comprises a) preparing an amorphous pigment precursor by customary methods by precipitation from an acid bismuth salt solution and a vanadate solution, which solutions may contain dissolved metal salts, metal oxides or nonmetal oxides, b) coating the amorphous pigment precursor so obtained with 1 to 50% by weight, based on the total amount, of an inorganic coating material conventionally used for coating pigments at a pH from 1 to 11, and subsequently c) heat treating it in the temperature range from 50° C. to 800° C. by customary methods and then deagglomerating it.

The possibilites of preparing different amorphous pigment precursors according to (a) are commonly known and are described, inter alia, in the above patent publications. The acid bismuth salt solution, for example, is an aqueous nitric solution of bismuth(III) acetate or, preferably, Bi(III) nitrate, and the vanadate solution is e.g. a solution of $NaVO_3$, $NH_4VO_3$, $Na_3VO_4$ or $V_2O_5$ in a sodium hydroxide or of potassium hydroxide. Expediently, the pigment precursor is thoroughly dispersed in a conventional disperser during or after precipitation in the reaction solution and prior to the coating procedure (b).

The pigment precursor obtained in (a) is preferably a pigment precursor of the commercially available bismuth vanadate pigment called C.I. Pigment Yellow 184 (see The Bulletin of the Bismuth Institute 68, 1995).

The coating according to (b) is preferably carried out using 10 to 30% by weight of coating material, based on the total amount.

Suitable coating materials are inorganic compounds such as phosphates and pyrophosphates of zinc, aluminium, calcium, magnesium, bismuth, iron or chromium, typically zinc phosphate [$Zn_3(PO_4)_2$], aluminium phosphate [$AlPO_4$], calcium phosphate [$Ca_3(PO_4)_2$], calcium pyrophosphate [$Ca_2P_2O_7$], magnesium phosphate [$Mg_3(PO_4)_2$], bismuth phosphate [$BiPO_4$], iron(II) phosphate [$Fe_3(PO_4)_2$], iron(III) phosphate [$FePO_4$], chromium(III) phosphate [$CrPO_4$] as well as calcium salts of oligophosphates, such as the calcium salt of Graham's salt, or a mixture of phosphates;

hydroxides, such as aluminium hydroxide [$Al(OH)_3$], zinc hydroxide [$Zn(OH)_2$], iron(II) hydroxide [$Fe(OH)_2$], iron(III) hydroxide [$Fe(OH)_3$], strontium hydroxide [$Sr(OH)_2$], calcium hydroxide [$Ca(OH)_2$], bismuth hydroxide [$Bi(OH)_3$], barium hydroxide [$Ba(OH)_2$], chromium(III) hydroxide [$Cr(OH)_3$], vanadium (IV) hydroxide [$V(OH)_4$], cobalt(II) hydroxide [$Co(OH)_2$], manganese hydroxide [$Mn(OH)_2$], or a mixture of hydroxides;

oxides or water-containing oxides, such as tin(II) oxide hydrate [$SnO.xH_2O$], tin(IV) oxide hydrate [$SnO_2.xH_2O$], titanium dioxide hydrate [$TiO_2.xH_2O$], circonium dioxide hydrate [$ZrO_2.xH_2O$], cerium(III) oxide hydrate [$Ce_2O_3.xH_2O$], cerium(IV) oxide hydrate [$CeO_2.x_2O$], silicium dioxide [$SiO_2$], antimony (III) oxide hydrate [$Sb_2O_3.xH_2O$], antimony(V) oxide hydrate [$Sb_2O_5.xH_2O$], or a mixture of oxides or water-containing oxides.

Also suitable are carbonates, nitrates, fluorides, fluorosilicates, molybdates, tungstates and, preferably, sulfates, such as calcium carbonate [$CaCO_3$], magnesium carbonate [$MgCO_3$], bismuth oxinitrate [$BiO(NO_3)$], bismuth oxifluoride [$BiOF$], calcium hexafluorosilicate [$CaSiF_6$], calcium molybdate [$CaMoO_4$], calcium sulfate [$CaSO_4$], or mixtures thereof.

Furthermore, all those combinations of phosphates, hydroxides, oxides or water-containing oxides and salts are possible which can be applied to amorphous pigment precursors by precipitation.

The hydroxides and, in particular, the phosphates, of zinc and aluminium are preferred. A mixture of zinc and aluminium phosphate is particularly preferred.

The coating composition is conveniently added in aqueous solution to the pigment precursor suspension and, where appropriate, an acid or base is added to adjust a pH which depends on the coating material used, it being advantageous to thouroughly disperse the product so obtained in a conventional disperser, e.g. a high-pressure homogeniser or a high-speed stirrer, before or after the addition of the coating composition and prior to the heat treatment.

Suitable acids are, for example, phosphoric acid and acetic acid and, preferably, nitric acid. The bases used may conveniently be aqueous alkali hydroxide solutions or ammonia solutions, preferably aqueous sodium hydroxide solution. The pH is crucial for the coating to make the coating materials precipitate. Phosphates preferably have a pH from 5 to 10, conveniently from 5 to 7. The hydroxides may have a pH in the range from 1 (bismuth hydroxide) to 11 (calcium hydroxide and barium hydroxide); the preferred aluminium hydroxides and zinc hydroxides, however, precipitate in the range from 4 to 8. Most oxides or water-containing oxides precipitate at a pH from 2 to 4. However, a higher pH up to 10 has no adverse influence. Silicium oxide precipitates at a pH from 2 to 9, preferably from 6 to 9. The other salts mentioned precipitate at a pH from 1 (bismuth oxinitrate) to 8 (calcium molybdate).

The heat treatment (c) (calcination) is carried out by customary methods at a temperature from preferably 100° to 600° C., more preferably from 300° to 450° C. and, most preferably, at 400° C.

If expedient for the envisaged use, the coating may be removed after calcination by treatment with an acid or base and may be replaced with other conventional coating compositions without having an adverse affect on the transparency. Suitable acids and bases are typically the same as have been mentioned above in connection with the adjustment of the pH.

The products obtained by the process of this invention are, as already mentioned, distinguished by a transparency which has never been achieved in bismuth vanadate pigments so far. These products are therefore novel and are also an object of this application.

The transparency is denoted here by $\Delta L^*$ in accordance with CIELAB, specifically by $\Delta L^* > 4$, where $$\Delta L^* = L^*(\text{white}) - L^*(\text{black}).$$

$L^*$(white) and $L^*$(black) are determined by colour measurement of an alkyd melamine paint application at a pigment content (solids content) of 38%, having a layer thickness (dry) of 40 μm on a black/white contrast card, and by calculation according to the CIELAB formula (ISO 7724-1 to 7724-3).

Accordingly, this invention also relates to bismuth vanadate pigments of the general composition $$Bi_2O_3 \cdot xV_2O_5,$$

wherein bismuth and vanadium may be partially replaced with other metals or nonmetals, which bismuth vanadate pigments have a transparency of $\Delta L^* > 4$ in an alkyd melamine paint application at a pigment content of 38% and at a layer thickness, dry, of 40 μm.

The metals and nonmetals which may partially replace bismuth and vanadium are preferably Li, Mg, Zn, Al and, in particular, Ca, and also W and, in particular, P and Mo.

Said bismuth vanadate pigments are preferably based on the above-mentioned C.I. Pigment Yellow 184 types.

The bismuth vanadate pigments of this invention are suitable for pigmenting high molecular weight organic material.

High molecular weight organic materials which can be pigmented with the novel bismuth vanadates are, for example, cellulose ethers and cellulose esters, typically ethyl cellulose, nitrocellulose, cellulose acetate and cellulose butyrate, natural resins and synthetic resins, such as polymerisation resins or condensation resins, e.g. aminoplasts, preferably urea/formaldehyde resins and melamine/formaldehyde resins, alkyd resins, phenoplasts, polycarbonates, polyolefins, such as polyethylene and polypropylene, polystyrene, polyvinyl chloride, polyacrylonitrile, polyacrylate, polyamides, polyurethanes, polyesters, rubber, casein, silicone and silicone resins, singly or in admixture.

It is irrelevant whether the above high molecular weight organic compounds are obtained as plastic materials, melts or in the form of spinning solutions, paints, coating materials or printing inks. Depending on their envisaged end use, it is advantageous to use the novel bismuth vanadates as toners or in the form of preparations. The novel bismuth vanadates may be used in an amount of 0.01 to 75% by weight, preferably of 0.1 to 50% by weight, based on the high molecular weight organic material to be pigmented.

In addition to their extraordinarily high chroma and transparency, the colorations obtained in, for example, plastic materials, fibres, paints or prints, are distinguished by their high tinting strength, good dispersibility, resistance to re-coating, migration, heat, light and weathering, as well as by their good gloss.

However, as mentioned above, the novel bismuth vanadates are very particularly distinguished by their high transparency. Accordingly, they are preferably suitable for colouring plastic materials, printing inks and aqueous and/or solvent-containing paints, in particular automotive paints. They are very particularly preferably used for metal effect finishes (metal or mica).

The invention is further illustrated by the following Examples in which percentages are by weight, unless otherwise stated.

EXAMPLE 1

98.4 g of bismuth nitrate pentahydrate and 6.4 g of calcium nitrate tetrahydrate are dissolved, with stirring, in 74.4 g of 54% nitric acid and 580 ml of water. The resulting solution is charged, with vigorous stirring, with a vanadate solution consisting of 35.4 g of sodium orthovanadate, 4.0 g of sodium hydroxide and 6.6 g of sodium molybdate dihydrate in 600 ml of water over 3 minutes. The pH of the resulting suspension is raised to 3.5 by adding a 20% solution of sodium hydroxide over some minutes. After stirring for 60 minutes, the pH of the suspension is raised to 6.5 by the addition of 1 molar sodium hydroxide solution over 20 minutes, and stirring is then continued for another 30 minutes. A solution of 39.0 g of 75% phosphoric acid, 53.0 g of aluminium sulfate hydrate and 44.0 g of zinc sulfate heptahydrate, dissolved in 300 ml of water, is added to this suspension over 20 minutes, the pH decreasing as a result. If the pH drops to below 2.0, a 20% solution of sodium hydroxide is added. The pH of the suspension is then adjusted to 6.5 with 1 molar sodium hydroxide solution over 60 minutes, and stirring is then continued for another 30 minutes. After filtering the suspension, the filter product is washed twice with 500 ml of water and dried at 100° C. and the solid obtained is calcined for 20 hours at 400° C. The calcination product is cooled and then deagglomerated in a pulveriser.

The pigment obtained is applied in an AM paint by the following procedure:

37.0 g of an alkyd melamine paint of the following composition:
  18.7 g of a short-chain alkyd resin (Setal® 84xx70 (70%), supplied by Synthese)
  7.2 g of a melamine resin (Setamin® US 132 BB70 (70%), supplied by Synthese)
  7.8 g of Solvesso® 100 (aromatic hydrocarbons; Esso)
  1.7 g of butanol
  0.8 g of depanol J (terpene hydrocarbon)
  0.8 g of isophorone
are placed together with 11.0 g of the pigment prepared according to Example 1 and with 40 g of glass beads (diameter 3 mm) in a 100 ml glass vessel with screw cap and are then dispersed in a Scandex apparatus until a degree of fineness of <10μ (Hegman gauge) is reached.

The paint is drawn on a contrast card (wet film thickness 75 μm), flashed off for 20 minutes and then stoved for 30 minutes at 130° C.

Colour measurements by the CIELAB method (ISO 7724-1 to 7724-3) give the following values: $\Delta L^* = 11.2$; $\Delta E^* = 25.0$.

EXAMPLE 2

98.4 g of bismuth nitrate pentahydrate and 6.4 g of calcium nitrate tetrahydrate are dissolved, with stirring, in 74.4 g of 54% nitric acid and 580 ml of water. The resulting solution is charged, with vigorous stirring, with a vanadate solution consisting of 35.4 g of sodium orthovanadate, 4.0 g of sodium hydroxide and 6.6 g of sodium molybdate dihydrate in 600 ml of water over 3 minutes. The pH of the resulting suspension is raised to 3.5 by adding a 20% solution of sodium hydroxide over some minutes. After stirring for 60 minutes, the pH of the suspension is raised to 6.5 by the addition of 1 molar sodium hydroxide solution over 20 minutes, and stirring is then continued for another 30 minutes. A solution consisting of 9.8 g of 75% phosphoric acid, 13.3 g of aluminium sulfate hydrate and 11.0 g of zinc sulfate heptahydrate, dissolved in 300 ml of water, is added to this suspension over 5 minutes, resulting in a pH of 1.2. The pH of the suspension is then adjusted to 6.5 with 1 molar sodium hydroxide solution over 90 minutes, and stirring is continued for another 30 minutes. After filtering the suspension, the filter product is washed once with 500 ml of water and dried at 100° C. and the solid obtained is calcined for 20 hours at 400° C. The calcination product is cooled and then deagglomerated in a pulveriser.

As described in Example 1, the resulting pigment is then applied in an AM paint and colour measurement is carried out, giving the following values: $\Delta L^* = 8.1$; $\Delta E^* = 19.7$.

EXAMPLE 3

239.0 g of bismuth nitrate pentahydrate and 12.8g of calcium nitrate tetrahydrate are dissolved, with stirring, in 140.0 g of 54% nitric acid and 1150.0 ml of water. The resulting solution is charged, with vigorous stirring, with a vanadate solution consisting of 70.8 g of sodium orthovanadate, 7.9 g of sodium hydroxide and 13.2 g of sodium molybdate dihydrate in 700 ml of water over 1 minute. The pH of the resulting suspension is then raised to 3.5 by adding a 20% solution of sodium hydroxide over some minutes. After stirring for 60 minutes, the pH of the suspension is raised to 6.5 by the addition of 1 molar sodium hydroxide solution over 20 minutes, and stirring is then continued for another 30 minutes. A solution consisting of 39.0 g of 75% phosphoric acid, 53.0 g of aluminium sulfate hydrate and 44.0 g of zinc sulfate heptahydrate, dissolved in 200 ml of water, is then added to this suspension over 5 minutes, resulting in a pH of 1.0. The pH of the suspension is then adjusted to 6.5 by the addition of a 50% solution of sodium hydroxide over 10 minutes, and stirring is continued for another 30 minutes. After filtering the suspension, the filter product is washed once with 500 ml and dried at 100° C. and the solid obtained is calcined for 16 hours at 400° C. The calcination product is cooled, made once more into a slurry in 2 l of water and then deagglomerated for 10 minutes using a high-speed stirrer. A solution consisting of 35.0 g of 75% phosphoric acid, 53.0 g of aluminium sulfate hydrate and 44.0 g of zinc sulfate heptahydrate, dissolved in 1200 ml of water, is then added to this suspension over 5 minutes, resulting in a pH of 2.0. The pH of the suspension is then adjusted to 6.5 by adding a 20% solution of sodium hydroxide over 10 minutes, and stirring is continued for another 30 minutes. After filtering the suspension, the filter product is washed once with 500 ml of water and dried at 100° C. and the solid obtained is calcined for 16 hours at 400° C. The calcination product is cooled and then deagglomerated in a pulveriser.

As described in Example 1, the resulting pigment is applied in an AM paint and colour measurement is carried out, giving the following values: $\Delta L^* = 9.2$; $\Delta E^* = 20.7$.

EXAMPLE 4

98.4 g of bismuth nitrate pentahydrate and 6.4 g of calcium nitrate tetrahydrate are dissolved, with stirring, in 74.4 g of 54% nitric acid and 580 ml of water. The resulting solution is then charged, with vigorous stirring, with a vanadate solution consisting of 35.4 g of sodium orthovanadate, 4.0 g of sodium hydroxide and 6.6 g of sodium molybdate dihydrate in 600 ml of water over 3 minutes. The pH of the resulting suspension is raised to 3.5 by adding a 20% solution of sodium hydroxide over some minutes. After stirring for 30 minutes, the pH of the suspension is raised to 6.5 by adding a 20% solution of sodium hydroxide over 60 minutes, and stirring is continued for another 30 minutes. A solution consisting of 53.0 g of aluminium sulfate hydrate and 44.0 g of zinc sulfate heptahydrate, dissolved in 600 ml of water, is then added to this suspension over 10 minutes, resulting in a pH of 3.1. The pH of the suspension is then adjusted to 6.5 by the addition of 1 molar sodium hydroxide solution over 120 minutes, and stirring is continued for another 30 minutes. After filtering the suspension, the filter product is washed three times with 500 ml of water and dried at 100° C. and the solid obtained is calcined for 24 hours at 400° C. The calcination product is cooled and then deagglomerated in a pulveriser. As described in Example 1, the resulting pigment is then applied in an AM paint and colour measurement is carried out, giving the following values: $\Delta L^* = 6.0$, $\Delta E^* = 15.2$.

EXAMPLE 5

123.6 g of bismuth nitrate pentahydrate are dissolved, with stirring, in 53.0 g of 54% nitric acid and 570 ml of water. The resulting solution is charged, with vigorous stirring, with a vanadate solution consisting of 48.9 g of sodium orthovanadate, 5.5 g of sodium-hydroxide in 600 ml of water over 3 minutes. The pH of the resulting suspension is raised to 3.5 by adding a 20% solution of sodium hydroxide over some minutes. After stirring for 30 minutes, the pH of the suspension is raised to 6.5 by adding a 20% solution of sodium hydroxide over 60 minutes, and stirring is then continued for another 16 hours. 1 g of sodium hexamethaphosphate is added to this suspension and dispersed for 6 minutes using a high-speed stirrer. After dispersing, a solution consisting of 66.5 g of aluminium sulfate hydrate, 55.0 g of zinc sulfate heptahydrate and 49.0 g of 75% phosphoric acid, dissolved in 600 ml of water, is added to this suspension over 10 minutes, resulting in a pH of 1.9. The pH of the suspension is adjusted to 6.5 with a 20% solution of sodium hydroxide over 30 minutes, and stirring is continued for another 30 minutes. After filtering the suspension, the filter product is washed twice with 500 ml of water and dried at 100° C. and the solid obtained is calcined for 24 hours at 400° C. The calcination product is cooled and then deagglomerated in a pulveriser. 50 g of the resulting pigment are redispersed in 2.0 l of water and 5.0 g of sodium hexametaphosphate over 20 minutes at 100° C. using a high-speed stirrer. A solution consisting of 7.6 g cerium(III) chloride in 250 ml of water is then added to this suspension over 10 minutes, resulting in a pH of 4.1. The pH of the suspension is raised to 10.0 with 1 molar sodium hydroxide solution over 15 minutes, and stirring is continued for another 30 minutes. After filtering the suspension, the filter product is washed twice with 500 ml of water and dried at 100° C. and the solid obtained is calcined for 16 hours at 400° C. The calcination product is cooled and then deagglomerated in a pulveriser.

As described for Example 1, the resulting pigment is applied in an AM paint and colour measurement is carried out, giving the following values: $\Delta L^* = 7.9$; $\Delta E^* = 19.5$.

What is claimed is:

1. A process for the preparation of transparent bismuth vanadate pigments, which comprises
    a) preparing an amorphous pigment precursor by precipitation from an acid bismuth salt solution and a vanadate solution, which solutions may contain dissolved metal salts, metal oxides or nonmetal oxides,
    b) coating the amorphous pigment precursor so obtained with 1 to 50% by weight, based on the total amount, of an inorganic coating material and subsequently
    c) heat treating it in the temperature range from 50° to 800° C. then deagglomerating it.

2. A process according to claim 1, wherein the coating (b) is carried out using 10 to 30% by weight of coating material, based on the total amount.

3. A process according to claim 1, wherein the coating material is an inorganic compound selected from the group consisting of phosphates and pyrophosphates, hydroxides, oxides, water-containing oxides, carbonates, nitrates, fluorides, fluorosilicates, molybdates and sulfates, or a mixture thereof.

4. A process according to claim 3, which comprises using hydroxides or phosphates of zinc or aluminium, or a mixture thereof.

5. A process according to claim 4, which comprises using phosphates of zinc or aluminium, or a mixture thereof.

6. A process according to claim 1, which comprises thoroughly dispersing the pigment precursor in a disperser before or after precipitation in the reaction solution and prior to the coating procedure (b).

7. A process according to claim 1, which comprises thoroughly dispersing the product obtained in the coating procedure (b) in a disperser before or after the addition of the coating composition and prior to the heat treatment.

8. A process according to claim 1, which comprises removing the coating after the heat treatment (c) by treatment with an acid or base.

9. A bismuth vanadate pigment of the general composition $$Bi_2O_3 x V_2O_5,$$

wherein bismuth and vanadium may be partially replaced with other metals or nonmetals, which bismuth vanadate pigments have a transparency of $\Delta L^* > 4$ in an alkyd melamine paint application at a pigment content of 38% and at a layer thickness, dry, of 40 µm.

10. A bismuth vanadate pigment according to claim 9, wherein the metals and nonmetals which can partially replace bismuth and vanadium are Li, Mg, Zn, Al, and Ca, W, P and Mo.

11. A bismuth vanadate pigment according to claim 9, which is a bismuth vanadate based on C.I. Pigment Yellow 184.

12. A high molecular weight organic material pigmented with a bismuth vanadate pigment as claimed in claim 9.

* * * * *